3,793,272
SYNTHETIC RESIN COMPOSITIONS OF VINYL OR ACRYLIC RESINS WITH HYDROXYBUTYLHYDROXYETHYL CELLULOSE
Shunichi Koyanagi and Kinya Ogawa, Yokohama, and Yoshiro Onda, Naoetsu, Japan, assignors to Shinetsu Chemical Company, Chiyoda-ku, Tokyo, Japan
No Drawing. Filed Aug. 30, 1971, Ser. No. 176,329
Claims priority, application Japan, Sept. 1, 1970, 45/76,819
Int. Cl. C08b 21/32; C08f 45/00
U.S. Cl. 260—17 R          8 Claims

ABSTRACT OF THE DISCLOSURE

Synthetic resin compositions in the form of emulsion or latex which contain hydroxybutylhydroxyethyl cellulose have superior stability against any pigments and salts that are present therein. They are useful for paints, adhesives, and textile-finishing agents.

BACKGROUND OF THE INVENTION

This invention relates to synthetic resin compositions, or more particularly, to stable synthetic resin emulsion- or latex-compositions.

Various synthetic resin emulsions or latices are widely used as paints, adhesives or textile-finishing agents, and in order to control the properties of these emulsions or latices, polyvinyl alcohol (hereinafter referred to as PVA) or, such cellulose ethers as methylcellulose (MC), and hydroxyethylcellulose (HEC) are usually employed as protective colloids or adhesive agents. But the emulsions in which PVA or MC is employed as a protective colloid have such a demerit as instability when mixed with salts or pigments. Especially in the case of PVA, a large amount of it has to be employed in order to prepare an emulsion of high viscosity. On the other hand, emulsions prepared by employing HEC are comparatively stable, when mixed with salts, but inferior in stability when mixed with pigments.

STATEMENT OF THE INVENTION

An object of the invention is to provide synthetic resin compositions superior not only in stability, when mixed with salts or pigments, but also in viscosity, which are characterized by getting synthetic resin emulsions or latices to contain hydroxybutylhydroxyethyl cellulose (HB-HEC).

It is not very clear why the synthetic resin compositions of the invention exhibit superior stability, but it is perhaps because HBHEC which is employed as an additive has a unique characteristic of being soluble in organic solvents such as methanol and ethanol, although it is soluble in water just like the above-given HEC is. Such a unique characteristic is supposed to give the synthetic resin compositions, containing it, a superior stability against pigments, besides an improved stability against salts just like the one given by HEC.

As mentioned above, HBHEC employed in the present invention is soluble both in water and in organic solvents, and it is prepared by the known method of reacting, for example, alkali cellulose with ethylene oxide and butylene oxide, and its compatibility with salts, solubility in water and organic solvents, and the gel point of its aqueous solution can be varied severally by varying the amounts of hydroxybutyl radicals and hydroxyethyl radicals. HBHEC employed in the present invention is represented by the structure given below:

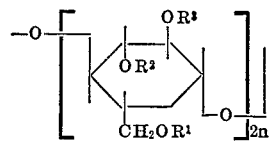

(where $R^1$, $R^2$ and $R^3$ are each selected from the group consisting of (1) hydrogen atom, (2) hydroxyethyl radical, (3) hydroxybutyl radical, and (4) hydroxyethyl radical or hydroxybutyl radical, the oxygen atom of whose hydroxyl group is bonded with one or more hydroxyethyl radicals or hydroxybutyl radicals by dehydrogenation, and where (i) at least one of the R's is hydroxyethyl radical and another one is hydroxybutyl radical, or (ii) at least one of the R's is hydroxyethyl radical or hydroxybutyl radical, the oxygen atom of whose hydroxyl radical is bonded with one hydroxybutyl radical or hydroxyethyl radical by dehydrogenation, and where $n$ is an integer), and what is especially desired of it, although never required of it, is that the average mole number of the bonded hydroxyalkyl radicals per anhydrous glucose unit in the cellulose (hereinafter referred to as M.S.) is from 0.1 to 2.0, or more preferably from 0.2 to 1.5 in the case of hydroxybutyl radicals, and from 1.0 to 3.0, or more preferably from 1.5 to 2.5 in the case of hydroxyethyl radicals, and that the viscosity of a 2% aqueous solution of it at 25° C. is from 10 to 30,000 cps.

The synthetic resins employed in preparing the compositions of the present invention include all the known ones such as polyvinyl acetate, polyvinyl chloride, polyvinylidene chloride, polyacrylic acid, polymethacrylic acid, polystyrene, polyacrylonitrile, polybutadiene, polychloroprene, polyethylene, polypropylene, polycarbonate, fluorine resin, phenol resin, urea resin, melamine resin, organopolysiloxane, olefinic petroleum resin and copolymers or mixtures of two or more of them.

The synthetic resin compositions of the invention are prepared by adding HBHEC to the above-given various synthetic resin emulsions or latices. The amount of HBHEC to be added to these emulsions or latices varies depending upon the kinds of the emulsions or latices, or upon the viscosities desired of the products, but generally, to 100 parts by weight of emulsions or latices, from 0.5 to 10, or more preferably from 1 to 5 parts by weight of HBHEC are added. In carrying out the addition, HBHEC in powder may be employed as it is or as dissolved in water or some organic solvent, or as mixed with salts or pigments to be added to the emulsion or latex.

In the following examples, parts and percentages are all given by weight.

Example 1

In a reactor were put 47 parts of vinyl acetate, 50 parts of water, 0.1 part of hydrogen peroxide, 0.1 part of tartaric acid, and 2.8 parts of polyvinyl alcohol (saponification degree: 88.1 mole percent; viscosity of a 4% aqueous solution: 19.5 cps.), and the mixture was subjected to the emulsion polymerization at 85° C. for 5 hours. The emulsion obtained had a viscosity of 13,000 cps. and contained 50% solid matter. To 30 parts of this emulsion were added 30 parts of aluminum sulfate and 1 part of HBHEC (M.S. of hydroxybutyl radical: 0.5; M.S. of hydroxyethyl radical: 2.5; viscosity of a 2% aqueous solution: 15,000 cps.), obtaining a composition whose viscosity was 15,000 cps. and which remained stable at room temperature for more than 3 months.

As a control a similar experiment was conducted in which HBHEC was replaced by MC (M.S. of methoxy radical: 1.8; viscosity of a 2% aqueous solution: 8,000 cps.), and the emulsion obtained got separated in 224 hours, giving a precipitate.

Example 2

| | Parts |
|---|---|
| 5% aqueous solution of HBHEC | 10 |
| M.S. of hydroxyethyl radical: 2.0 | |
| M.S. of hydroxybutyl radical: 0.7 | |
| Viscosity of a 2% aqueous solution of HBHEC: 1,000 cps. | |
| Sodium pyrophosphate | 0.15 |
| Rutile-type titanium oxide | 22.5 |
| Mica through 325 mesh | 5 |
| Water | 16 |

A mixture of the components given above was well stirred and kneaded on a kneader into a paste. To a latex prepared by well mixing 33.3 parts of polyvinylidene chloride latex (viscosity: 10 cps.; resin density: 48%) and 1.4 parts of dibutyl phthalate was added the above-given paste followed by 6.3 parts of a 5% aqueous solution of HBHEC mentioned above, 4.5 parts of diethylene glycol monoethyl ether, 0.5 part of oleic acid, and 0.35 part of a 29% ammonia. The emulsion thus prepared remained stable at room temperature for more than 3 months. As a control, a similar experiment was conducted in which HBHEC was replaced by PVA (saponification degree: 88 mole percent; viscosity of a 4% aqueous solution: 25 cps.), obtaining an emulsion which got separated, giving a precipitate in 1 week.

Example 3

30 parts of phenol, 30 parts of 30% aqueous formalin, and 2 parts of aqueous ammonia (specific gravity: 0.90), were put in a reactor and were heated until the mixture got boiled to be reacted for 2 hours. Subsequently to the reaction product were added 3 parts of HBHEC (M.S. of hydroxyethyl radical: 1.5; M.S. of hydroxybutyl radical: 1.3; viscosity of a 2% aqueous solution: 4,000 cps.) dissolved in 35 parts of water. The emulsion thus prepared exhibited superior property as an adhesive for wood and metal plates, and remained stable at room temperature for more than 3 months.

As a control a similar experiment was conducted in which HBHEC was replaced by HPMC (D.S. of methoxy radical: 1.8; M.S. of hydroxypropyl radical: 0.3; viscosity of a 2% aqueous solution: 4,000 cps.). The stability and the adhesion to wood and metal plates of the emulsion thus prepared were compared with those of the other one. The results obtained were as given below.

| | HBHEC (present invention) | HPMC (control) |
|---|---|---|
| Stability | Stable even after the lapse of 3 months. | Got separated in 2 weeks. |
| Adhesion | Good | Bad. |

Example 4

20 parts of titanium dioxide, 5 parts of clay, 5 parts of mica, 0.4 part of polyoxyethylene alkylphenol ether, 0.6 part of HBHEC (M.S. of hydroxyethyl radical: 2.7; M.S. of hydroxybutyl radical: 0.8; viscosity of a 2% aqueous solution: 12,000 cps.), 5 parts of a 9.3% methanol solution of zinc fluorosilicate, and 29 parts of water were well mixed in a ball mill, and to the mixture were gradually added 35 parts of styreneacrylic latex. The product obtained was an emulsion paint, which exhibited excellent properties as a paint when applied to mortar walls or concrete walls. When let to stand at 60° C., it remained stable for more than 3 months.

As a control, a similar experiment was conducted in which HBHEC was replaced by HEC (M.S. of hydroxyethyl radical: 2.5; viscosity of a 2% aqueous solution: 12,000 cps.), and the stability in storage and the coatability of the emulsion paint thus prepared were compared with those of the other one. The results obtained were as follows.

| | Present invention | Control |
|---|---|---|
| Stability in storage (60° C.). | Stable even after the lapse of 1 month. | Got separated in 24 hours. |
| Freeze stability | Good | Good. |
| Brush-coatability | do | Bad. |
| Coating condition | do | Good. |

Example 5

50 parts of polyisobutylene, 5 parts of HBHEC (M.S. of hydroxyethyl radical: 1.8; M.S. of hydroxybutyl radical: 0.5; viscosity of a 2% aqueous solution: 4,000 cps.), 2 parts of stearic acid, 1 part of triethanolamine, and 42 parts of water were well mixed at 90° C. The emulsion thus prepared exhibited a property of forming a film superior in water-proofness and insulation, and it remained stable at room temperature for more than 3 months.

As a control, a similar experiment was conducted in which HBHEC was replaced by HEMC (D.S. of methoxy radical: 1.5, M.S. of hydroxyethyl radical: 0.2; viscosity of a 2% aqueous solution: 4,000 cps.), and the stability in storage of the emulsion thus prepared and the water-proofness and insulation of the film formed of it were compared with those of the other one. The results obtained were as follows.

| | Present invention | Control |
|---|---|---|
| Stability in storage | Stable even after the lapse of 3 months. | Got separated in 2 weeks. |
| Water proofness | Good | Bad. |
| Insulation | do | Good. |

Example 6

15 parts of polypropylene and 2 parts of stearic acid were dissolved in 100 parts of trichloroethylene at 70–80° C., and to the solution were added 1 part of sodium carbonate and 7 parts of HBHEC (M.S. of hydroxyethyl radical: 2.5; M.S. of hydroxybutyl radical: 1.0; viscosity of a 2% aqueous solution: 8,000 cps.), both dissolved in 75 part of water. The emulsion obtained exhibited a fine property as a textile finishing agent, and it remained stable at 60° C. for more than 1 month.

As a control, a similar experiment was conducted in which HBHEC was replaced by CMC (viscosity of a 2% aqueous solution: 8,000 cps.), and the stability in storage of the emulsion prepared, the softness and the wrinkle-proofness of the textile treated with it as a finishing agent were compared with those of the other one. The results obtained were as follows.

| | Present invention | Control |
|---|---|---|
| Stability in storage | Stable even after the laspe of 1 month. | Got separated in a week. |
| Softness of the textile treated with it. | Good | Bad. |
| Wrinkle-proofness of the textile treated with it. | do | Bad. |

What is claimed is:

1. A synthetic resin composition which comprises an emulsion or latex of a vinyl or acrylic resin selected from the group consisting of polyvinyl acetate, polyvinyl chloride, polyvinylidene chloride, polyacrylic acid, polymethacrylic acid, polystyrene, polyacrylonitrile, polyethylene and polypropylene, and copolymers of the monomers comprising said resins or mixtures of said resins; and hydroxybutyl-hydroxyethyl cellulose wherein the average mole numbers of the hydroxybutyl groups and hydroxyethyl groups per anhydrous glucose unit contained in the cellulose are from 0.1 to 2.0, and from 1.0 to 3.0, respectively, and the viscosity of its 2% aqueous solution is from 10 to 30,000 cps. at 25° C., in an amount of from about 0.5 to 10 parts by weight per 100 parts by weight of said emulsion or latex.

2. The composition claimed in claim 1, wherein said hydroxybutylhydroxyethyl cellulose has an average mole number of the bonded hydroxyalkyl radicals per anhydrous glucose unit in the cellulose of from 0.2 to 1.5 in the case of hydroxybutyl radicals, and of from 1.5 to 2.5 in the case of hydroxyethyl radicals.

3. The composition claimed in claim 1, wherein said hydroxybutylhydroxyethyl cellulose is in an amount of from 1 to 5 parts by weight on 100 parts by weight of said synthetic resin emulsion or latex.

4. The synthetic resin composition of claim 1 which comprises a polyvinyl acetate emulsion, aluminum sulfate, and hydroxybutylhydroxyethyl cellulose.

5. The synthetic resin composition of claim 1 which comprises a polyvinylidene chloride latex, titanium oxide, and hydroxybutylhydroxyethyl cellulose.

6. The composition of claim 1, wherein the resin is polyvinyl acetate.

7. The composition of claim 1, wherein the resin is polyvinylidene chloride.

8. The composition of claim 1, wherein the resin is polypropylene.

References Cited
UNITED STATES PATENTS

| | | | |
|---|---|---|---|
| 3,296,247 | 1/1967 | Klug | 260—231 A |
| 3,449,271 | 6/1969 | O'Connor et al. | 260—17 R |
| 3,483,148 | 12/1969 | Desmarais | 260—17 R |

WILLIAM H. SHORT, Primary Examiner

L. M. PHYNES, Assistant Examiner

U.S. Cl. X.R.

260—29.6 MM, 29.6 RB, 41 B, 231 A